United States Patent [19]

Kaesgen et al.

[11] Patent Number: 5,044,478

[45] Date of Patent: Sep. 3, 1991

[54] FOOT PEDAL OPERATED POSITIONING CONTROL

[75] Inventors: Jurgen Kaesgen, Brunswick; Rudolf Siegrist, Valley City, both of Ohio

[73] Assignee: MTD Products Inc, Cleveland, Ohio

[21] Appl. No.: 484,802

[22] Filed: Feb. 26, 1990

[51] Int. Cl.⁵ .............................................. B60K 20/00
[52] U.S. Cl. ...................................... 192/4 R; 74/474; 74/478; 74/480 R; 180/370; 192/144
[58] Field of Search ...................... 74/474, 478, 480 R, 74/481; 180/370; 192/4 R, 4 C, 144

[56] References Cited

U.S. PATENT DOCUMENTS 4,620,575 11/1986 Cuba et al. ..................... 74/481 X
4,955,249 9/1990 Wetor .............................. 74/474 X Primary Examiner—Allan D. Herrmann
Assistant Examiner—David W. Laub
Attorney, Agent, or Firm—Woodling, Krost & Rust

[57] ABSTRACT

A foot pedal operated control positioning device for a continuously variable transmission wherein a movable bushing is aligned with a preset stop in order to set the transmission into a known neutral condition.

18 Claims, 4 Drawing Sheets

FOOT PEDAL OPERATED POSITIONING CONTROL

FIELD OF THE INVENTION

This invention relates to a foot pedal operated control position verification mechanism, preferably for use with hydrostatic transaxles incorporated in lawn and garden tractors.

BACKGROUND OF THE INVENTION

More and more consumer and industrial equipment includes a variable speed transmission mechanism as the operative connection between the engine and the drive wheels of a vehicle or tractor. Typical examples include hydrostatic transmission garden tractors and continuously variable belt transmission lawn and garden tractors. These types of variable speed transmissions give the manufacturer of the equipment a fairly reliable transmission for the device while providing the user of such equipment with an intuitively operated vehicle speed and direction control mechanism. However, one major limitation to these variable speed devices is the difficulty in accurately and reliably locating the transmission in a neutral position (such as would occur when the vehicle is being stopped). This causes a creep of the vehicle (if no brake is applied) or an unnecessary engine load (if a brake is applied). The creep normally necessitates the use of a separate braking mechanism in order to retain the vehicle or tractor in a single position even though the transmission control might be in a nominal neutral position. The unnecessary engine load increases the amount of wear on both the engine and the transmission: the transmission, being constantly engaged, uses at least some of the engine power as heat, wheel rotation or other waste product. The lack of neutral in addition complicates the life of the operator by forcing the operator to utilize some separate mechanism (a bypass value, a clutch, etc.) in order to insure an effective neutral for the vehicle. Some conventional cures for the lack of positive neutral (such as a fluidic neutral bypass dump value in a hydrostatic transmission) present problems in the ongoing operation of the vehicle (such as loss of control on hills for a fluidic neutral bypass—the back pressure of the transmission being needed to keep the vehicle in position). These difficulties and others present significant obstacles for the utilization of variable speed transmissions.

This present invention is directed towards providing a simple control mechanism for placing the variable speed transmission in a neutral or otherwise known condition.

SUMMARY OF THE INVENTION

The present invention is directed to providing an improved foot operated neutral positioning mechanism for a variable speed transmission.

It is an object of this invention to improve the control of variable speed transmissions.

It is an object of this invention to increase the service life of variable speed transmissions.

It is an object of this invention to increase customer acceptance of variable speed transmissions.

It is an object of this invention to improve the operator control of a vehicle including a variable speed transmission.

Other objects and a more complete understanding of the invention may be had by referring to the following description and drawings in which:

DESCRIPTION OF THE PREFERRED EMBODIMENT

Figure 1:
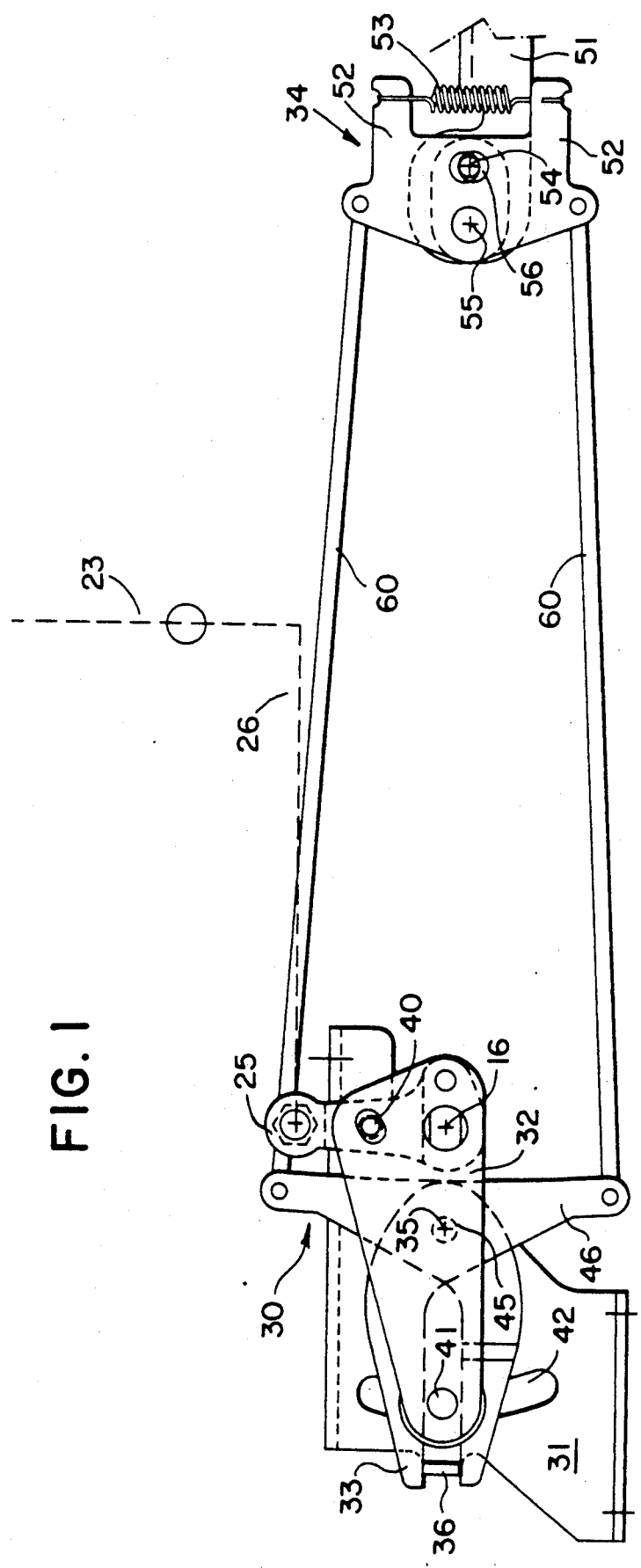
FIG. 1 is a downward view of a preferred control mechanism for a hydrostatic transaxle garden tractor showing the mechanism in an engaged neutral position.
Figure 2:
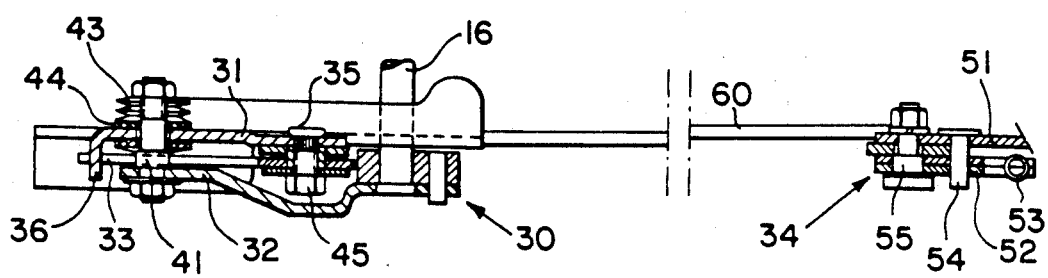
FIG. 2 is a side view of the control mechanism of FIG. 1.

This invention relates to an improved control for a variable speed transmission. The invention will be described in its preferred embodiment as the foot pedal control for a lawn and garden tractor including a hydrostatic transaxle. The basic hydrostatic transaxle for this preferred garden tractor is described in the U.S. Pat. No. 4,862,767, Issued Sept. 5, 1989.

The basic transaxle 10 includes a housing 11, an input pulley 12, a hydrostatic power unit 13, a braking mechanism 14, and an axle 15.

The housing 11 of the device is designed to hold the hydrostatic power unit 13 and internal gears (not shown) in operative position in respect to each other and in respect to the frame 20 of the lawn and garden tractor. The particular unit 13 shown is interconnected to a vertical shaft engine (not shown) by a belt 29 extending between a pulley on the engine to the input pulley 12 of the transaxle 10. This belt drive includes a selectably disengageable idler clutch mechanism 22 that permits the total disengagement of power from the input pulley 12 upon the manipulation of the control pedal 50 (as later described). This total disengagement is preferred even though not absolutely necessary. The hydrostatic power unit 13 in turn takes the torque from the belt drive to the input pulley 12 into the transaxle 10 and translates such torque into a variable speed and direction movement of the garden tractor. The speed and direction of the tractor depend upon the setting of a rotary control 16 that is protruding upwards off the top of the power unit 13. The braking mechanism 14 applies a braking force to a geared shaft of the transmission 10 in order to provide a stopping force for the garden tractor. The braking mechanism 14 is applied by the brake pedal 50 through an actuation rod 70 with associated over travel spring 71. The axles 15 are driven by the power unit 13 through the reduction gears in the hydrostatic transaxle 10, with a direction and speed of rotation of the axles 15 dependent again upon the setting of the rotary control 16 for the transaxle.

Figure 3:
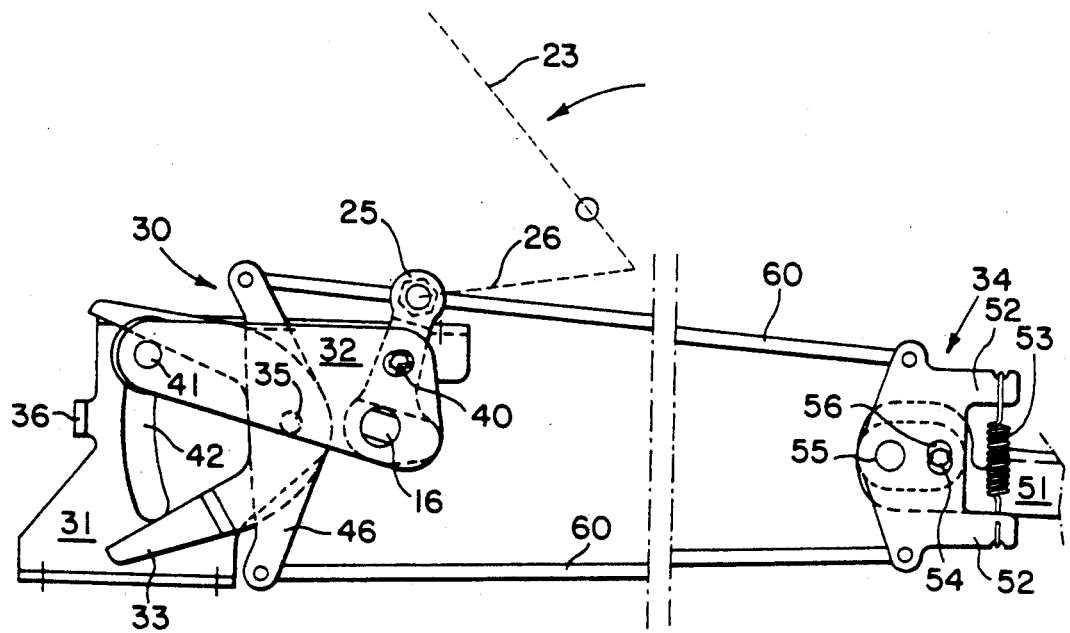
FIG. 3 is a downward view like FIG. 1 of the preferred control mechanism in a disengaged, floating position.
Figure 4:
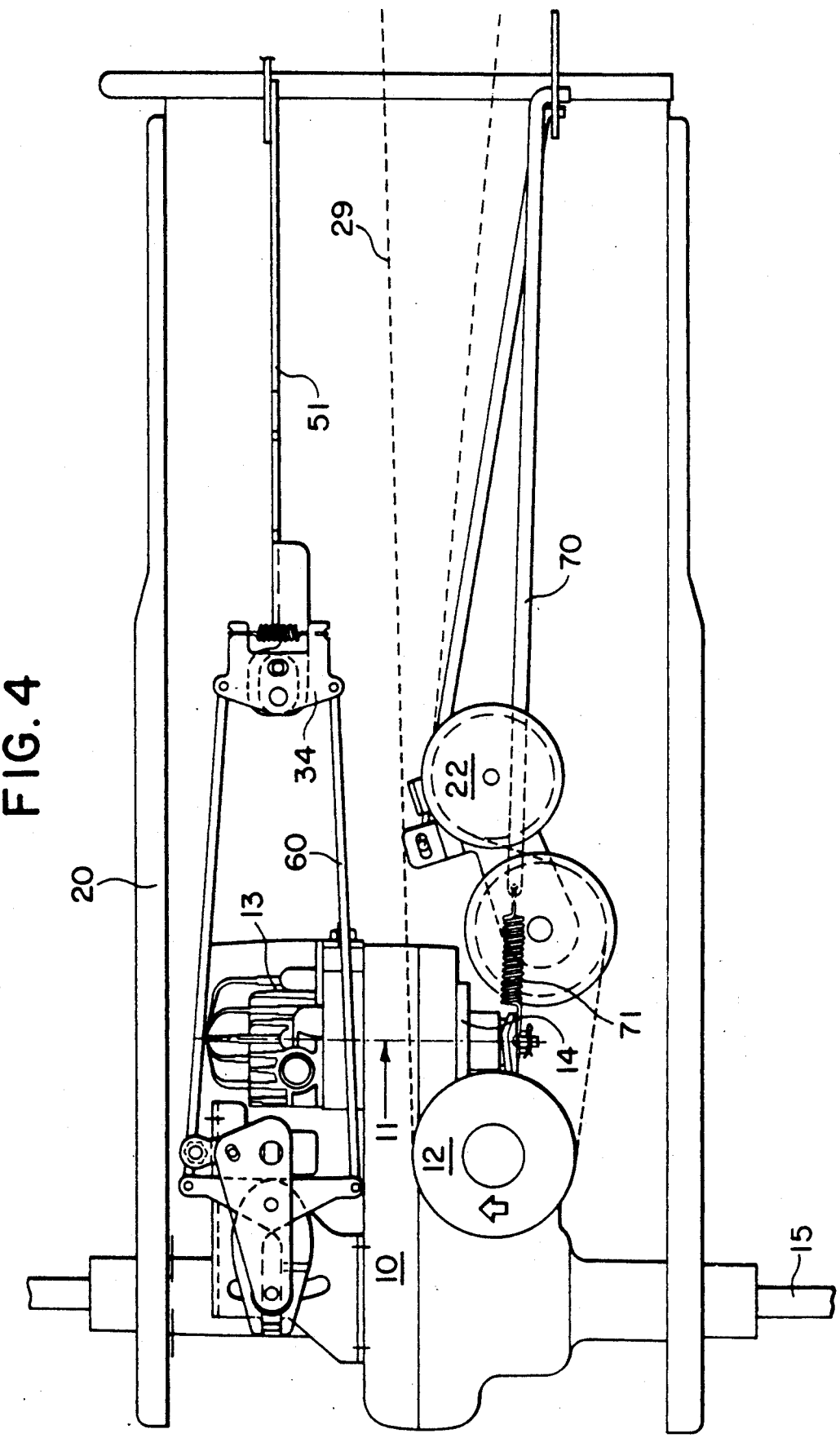
FIG. 4 is a top view of a complete vehicle drive train incorporating the preferred control mechanism of FIGS. 1 and 2; and, FIG. 5 is a side view of the drive train of FIG. 4.
Figure 5:
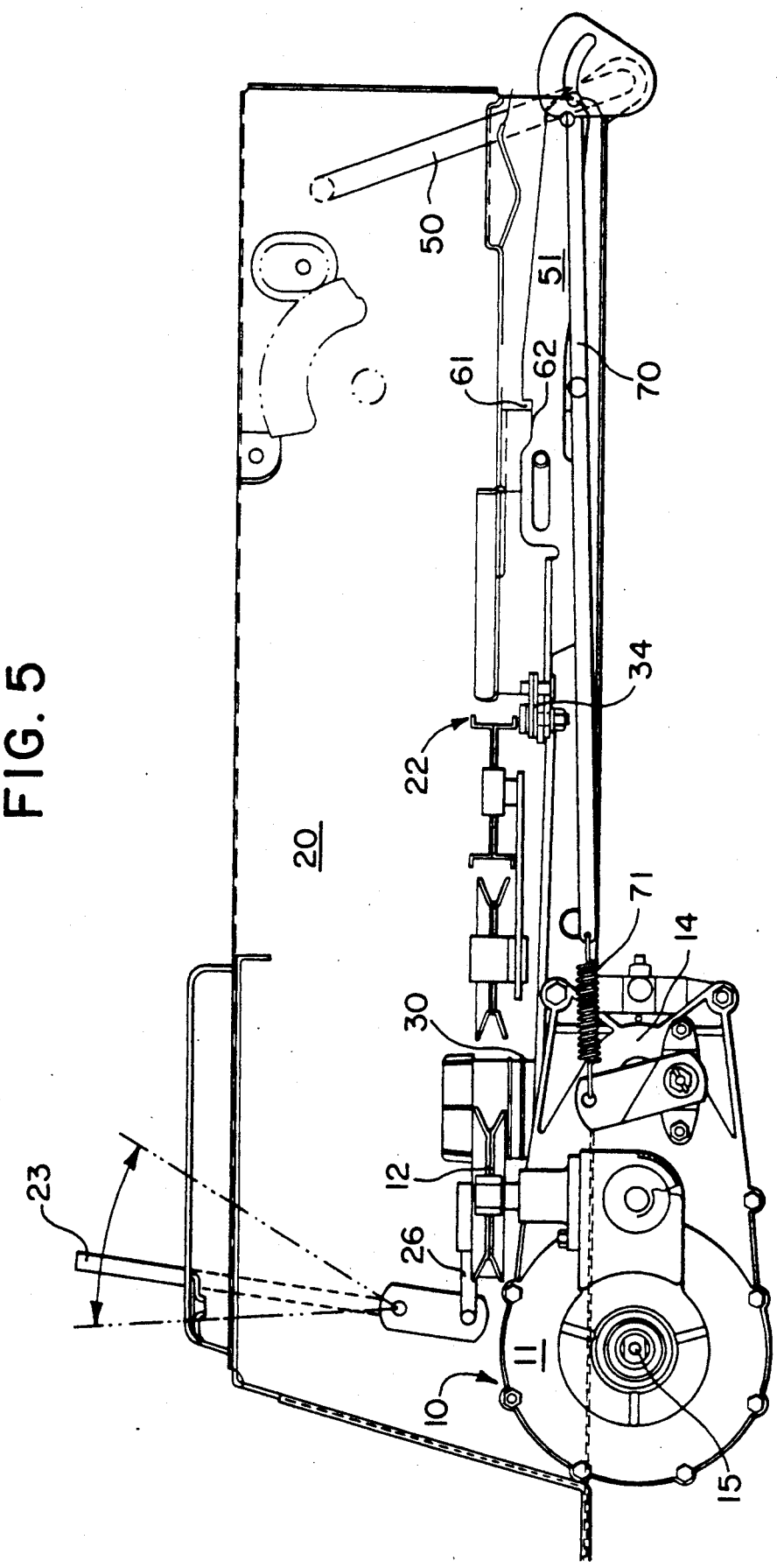

In ordinary operation the angle of the rotary control shaft 16 for the hydrostatic power unit is controlled by the operator via some mechanism such as a hand operated lever 23 (shown in symbolic form in FIGS. 1 and 3, actual form FIG. 5). This manual control lever 23 is interconnected to an intermediate lever 25 by a solid rod 26. The intermediate lever 25 is itself in turn fixedly connected to the rotary control shaft 16 for rotation therewith. Due to this interconnection, any movement of the control lever 23 is translated into a commensurate rotation of the control shaft 16. This rotation of the control shaft 16 in turn controls the speed and direction of the garden tractor with which the transaxle 10 is being utilized.

In the preferred embodiment the invention of the present application is utilized in order to provide a brake pedal neutral override of the setting of the control shaft 16 occasioned by the manual positioning of the control lever 23. The override 30 includes a mounting bracket 31, an actuating lever 32, actuating jaws 33, and a compensating mechanism 34.

The bracket 31 is fixedly connected to the hydrostatic transaxle 10 adjacent to the control shaft 16 of the hydrostatic power unit 13. This bracket 31 is bolted to one side of the hydrostatic power unit 13 by one of the bolts that hold the hydrostatic power unit 13 to the casing 11 of the transmission 10 and on the other side by two of the bolts that hold the two housing halves of the casing 11 together. These bolts retain the bracket 31 in a fixed position in respect to the rotary control shaft 16. The bracket 31 provides a fixed pivot point 35 (for the jaws 33 as later described), a fixed position neutral stop 36 as well as forming part of the control 25 position retention mechanism (later described). Fixedly connecting the bracket 31 directly to the hydrostatic transmission insures that there is no movement between the pivot point 35, the stop 36, and the rotary control shaft 16. (The frame of the vehicle and other parts twist and flex during the normal operation of the vehicle. This flexing changes the dimensions and tolerances of the vehicle momentarily and over time. The direct connection effectively removes any need to consider these changes in the design of the positioning control.) The pivot point 35 is preferably located along the line between the axis of rotation of the control shaft 16 and the center line of the stop 36 (for reasons later described). The neutral stop 36 shown is an integral flange protruding upwards off of the bracket 31.

The actuation lever 32 is adjustably bolted at one end to the lever 25 for rotation therewith. There is a bushing 41 located on the other end of the actuation lever 32. This bushing 41 is positioned on the actuation lever 32 such that when the control shaft 16 is in its neutral position, the center axis of the bushing 41 is on the line between the axis of rotation of the shaft 16 and the center of the stop 36. Due to this positioning, the alignment of the center axis of the bushing 41 in line with the axis of rotation of the control shaft 16 and the center of the stop 36 will place the hydrostatic transmission 13 in its neutral position. The bushing 41 shown is a shoulder bolt extending through a hole in the actuation lever 32. The width of the bushing 41 is equal to the width of the stop 36. This dimensioning facilitates the neutral alignment of these parts (as later described).

In the preferred embodiment disclosed, the angular relationship between the actuation lever 32 and the control lever 23 can be selectively adjusted within a range of perhaps plus or minus five degrees through the selective loosening and tightening of the bolts 40 extending there between. This allows for an angular adjustment between the bushing 41 and the rotary control 16 so as to adjust the angular location of the bushing 41 to exactly correspond to a neutral setting of the rotary control (important in view of the non-adjustability of the stop 36 shown). The use of an adjustment between two levers 25, 32 is preferred both for providing physical room for the adjustment and for the surety of the adjustment when made. Other means of adjustment could also be utilized including movement of the stop 36.

The bushing 41 extends through a slot 42 in the bracket 31. On the backside of the bracket 31 there are a series of tension washers 43 extending between the bushing 41 and the bracket 31. These tension washers 43 apply a force on two friction washers 44 on either side of the bracket 31. The friction washers 44 are made of an organic brake material. These friction washers 44 in turn act to retain the control lever 23 (and actuation lever 32) in the position which is set by the operator. This tension holds the rotary control shaft 16 in the position which is set by the lever 23 against the neutral return forces generated within the hydrostatic transaxle 10 as well as any vibratory or other unintended forces which are external to such power unit 13.

The jaws 33 are rotatively mounted to the bracket 31 by a bolt 45 at the pivot point 35. These jaws are able to freely rotate around this pivot point 35. The pivot point 35 shown in the preferred embodiment is located between the control shaft 16 and the bushing 41. The distance between the pivot point 35 for the jaws 33 and the bushing 41 is thus less than the distance between the rotary control shaft 16 and the bushing 41. This provides a longer lever arm for the actuation lever 32, thereby reducing the foot pedal forces necessary to move such lever 32 (and thus the rotary control shaft 16). Other orientations could also be utilized. When open (FIG. 3) the two parts of the jaws 33 are positioned with the bushing 41 located somewhere there between. When closed (FIG. 1) the two parts of the jaws 33 are parallel to each other so as to create a mouth having a width substantially equal to that of the bushing 41 and stop 36. As the bushing 41 and stop 36 have identical widths, the parallel closed jaws 33 aligns the bushing 41 to the stop 36.

The jaws 33 are selectively moved between open (FIG. 3) and closed positions (FIG. 1) by the foot pedal 50 so as to place the transmission into a neutral position.

The movement of the jaws 33 is occasioned by the positioning of two arms 46 which are formed integral therewith. In the particular embodiment disclosed, the movement of the arms 46 is occasioned by a brake pedal 50 through the compensating mechanism 34.

The compensating mechanism 34 allows the jaws 33 to float with the bushing 41 while also reducing the need for any adjustment of the interconnection between the override mechanism 30 and the brake pedal 50. The compensating mechanism 34 takes the longitudinal travel of the single part 51 and connects it to the two rods 60 by two rotatively interconnected arms 52 and an over travel spring 53. The arms 52 directly translate the longitudinal travel of the part 51 into movement of the rods 60 within the limits of movement allowed by the jaws 33, i.e. until the jaws 33 close about the stop 36 (at which point the jaws 33 no longer can move further). The over travel spring 53 allows the part 51 to move forward even after the jaws 33 have closed around the stop 36. This reduces the need for initial or subsequent adjustment of this critical interconnection. Note that a hole 56 in each arm 52 and holes surround the stationary pin 54. These holes will engage the pin 54 to physically solidly interconnect the part 51 to the rods 60 in the event the spring 53 breaks.

Insofar as this particular override control 30 is concerned, the pedal 50 has two operative positions, on and off.

In the "on" position (FIG. 1) the brake pedal 50 occasions a reliable control of the neutral positioning of the rotary control shaft 16 by closing the jaws 33 about the bushing 41 and stop 36 so as to align the same into the position set by the factory as the neutral position for the transmission 13. In the "off" position the jaws 33 float with the bushing 41 so as to allow the movement of the rotary control shaft 16 without relative interference.

It is important that the position of alignment of the pivot 35, the bushing 41, and stop 36 as produced by the jaws 33 in a closed "on" position (FIG. 1) correspond with a neutral position of the rotary control 16. This correspondence is first established during manufacture when the manufacturer adjusts the angular orientation between the actuation lever 32 and the intermediate lever 25 such that the neutral alignment occurs. The manufacturer then tightens down the bolts 40 to lock in this angular orientation. Thereafter, anytime the jaws 33 close (FIG. 1), the alignment of the pivot 35, bushing 41, and stop 36 places the rotary control 16 in its precise neutral position. As the exact angular neutral position for a rotary control 16 on a particular power unit 13 may be (and usually is) different from that for other nominally identical power units, this adjustment by the bolts 40 allows the manufacturer to readily adjust every power unit to have an exact neutral setting when the pivot 35, bushing 41, and stop 36 are aligned. This allows compensation for any variances between transmissions (the angular neutral position of the rotary control shaft 16 is not the same for every unit). Note that, in the preferred embodiment, the adjustment can be made again if necessary. This allows the user to reset the neutral position should it ever vary from that set by the manufacturer. This allows compensation for any wear, control bending, etc. that may occur in the service life of the particular unit. Note also that the position of the bushing 41 could be otherwise adjusted or that the position of the stop 36 could be adjusted to provide for this neutral positioning.

After manufacture the vehicle is acquired by a user. To operate the vehicle the operator manually moves the control lever 23 forward and backwards to select the direction and speed of the vehicle. The friction washers 44 on the actuating lever 32 hold the control shaft 16 of the hydrostatic power unit 13 in the position preset by the control lever 23 against normal residual forces from within the power unit 13 and external thereto. As the actuating lever 32 moves with the control shaft 16, the bushing 41 also moves within the confines of the unrestrained jaws 33. Upon application of the brake pedal 50, the part 51 and rods 60 are moved longitudinally forward which in turn pulls the arms 46 of the jaws 33 forward. This action closes the jaws 33 of the override 30 until one jaw contacts the stop 36 and the other contacts the bushing 41. At this time further pressure on the brake pedal 50 physically moves the bushing 41 (the jaw contacting the stop 36 is unable to move) until the bushing 41 is placed into alignment between the pivot point 35 and the stop 36. This trapping action returns the rotary control 16 to its exact neutral position. This action returns the power unit 13 to its exact preset neutral position irrespective of the initial setting of the manual control lever 23. The action also pulls the control lever 23 back to its central neutral position. (Note that a partial application of the brake pedal 50 would also reduce the speed of the vehicle without setting such vehicle in absolute neutral. This may be handy in certain situations.)

In the preferred embodiment disclosed the application of the brake pedal also disengages the idler clutch mechanism 22 simultaneously with placing the power unit 13 into neutral and subsequently applies the braking mechanism 14 by the brake rod 70 and over travel spring 71. This further action completely removes power from the vehicle drive system as well as actively physically retains the vehicle in its then physical position. The engagement of the parking brake 61 into the notch 62 in the part 51 would then lock the vehicle in this condition (exact neutral of the control 16, clutch disengaged and brake on). When the brake pedal is released (clutch engaged, brake off), the vehicle remains stationary with no creep; the invention of the application has set the power unit 13 into a known neutral condition: The vehicle would only move upon the physical movement of the control lever 23. This provides a measure of positive speed and direction control not previously possible.

A parking stop 61 is selectively interconnected into a small notch 62 in the part 51 in order to provide for a parking brake for the device. This stop 61 is selectively operated by the operator of the vehicle by pulling a lever (not shown) upwards against its own weight so as to engage the stop 61 with the notch 62 to lock the brake in its activated position. Thereafter pushing the pedal so forward will cause the stop 61 to disengage from the notch 62 (the stop 61 moving upwards due to its over center weight) and thus deactivate the brake.

Although this invention has been described in its preferred embodiment with some particularity, it is to be understood that numerous changes may be made without departing from the invention as hereinafter claimed.

What is claimed is:

1. In a variable speed transmission having a rotary speed control including a neutral position, a positioning control comprising an actuation lever, said actuation lever having two ends, one end of said actuation lever being fixedly connected to the rotary speed control for rotation therewith, a bushing, said bushing being fixedly connected to the other end of said actuation lever, a stop, said stop being fixedly connected to the transmission with the alignment of said bushing to said stop placing the rotary speed control into its neutral position, jaws, said jaws being selectively moveable between two positions, one position of said jaws aligning said bushing with said stop, the other position of said jaws allowing the movement of said bushing in respect to said stop, and a selectively movable control, said selectively movable control actively moving said jaws to said one position thereof upon the selective movement of said movable control so as to place the rotary speed control into its neutral position.

2. The position control of claim 1 characterized in that said jaws are pivotally mounted to said transmission.

3. The positioning control of claim 2 characterized in that said jaws are pivotally mounted to said transmission in line with said stop and the rotary speed control.

4. The positioning control of claim 1 characterized by the addition of a means to selectively adjust the fixed connection between said one end of said actuation lever and the rotary speed control.

5. The positioning control of claim 1 characterized by the addition of a means to selectively adjust the fixed connection between said bushing and said other end of said actuation lever.

6. The positioning control of claim 1 wherein the angular location between said bushing and said stop is selectively adjustable so as to cause the alignment of said bushing to said stop to correspond exactly with the neutral position of the rotary speed control.

7. The positioning control of claim 1 wherein the position of the rotary speed control is selectively set by a manual control lever and characterized in that the control lever is connected to the rotary speed control through said actuation lever.

8. The positioning control of claim 1 characterized in that the position of the rotary speed control is retained by tension washers extending between said actuation lever and the transmission.

9. The positioning control of claim 7 characterized in that the position of the rotary speed control is retained by tension washers extending between said actuation lever and the transmission.

10. The positioning control of claim 1 wherein the transmission is utilized in a vehicle having a brake pedal and characterized by the addition of a compensating mechanism and said brake pedal moving said jaws through said compensating mechanism.

11. The positioning control of claim 10 characterized in that said compensating mechanism includes an over travel spring.

12. In a variable transmission having a rotary speed control rotating about an axis of rotation and including a neutral position, a positioning control comprising an actuation lever, said actuation lever having two ends, one end of said actuation lever being fixedly connected to the rotary speed control for rotation therewith, a bushing, said bushing being fixedly connected to the other end of said actuation lever, a bracket, said bracket being fixedly connected to said transmission, a stop, said stop being fixedly connected to said bracket with the alignment of said stop and said bushing and said axis of rotation of said rotary speed control placing the rotary speed control into its neutral position, jaws, said jaws being relatively mounted to said bracket, said jaws being selectively moveable between two positions, one position of said jaws aligning said bushing with said stop, the other position of said jaws allowing the movement of said bushing in respect to said stop, and a selectively movable control, said selectively movable control actively moving said jaws to said one position so as to place the rotary speed control into its neutral position thereof upon the selective movement of said movable control.

13. The positioning control of claim 12 characterized in that said jaws are pivotally mounted to said bracket substantially in line with said stop and said rotary speed control.

14. The positioning control of claim 12 characterized by the addition of an intermediate lever, said intermediate lever being fixedly connected to said rotary speed control and said one end of said actuation lever being selectively fixedly connected to said intermediate lever.

15. The positioning control of claim 12 wherein the position of the rotary speed control is selectively set by a manual control lever, and characterized in that the manual control lever is connected to the rotary speed control through said intermediate lever.

16. The positioning control of claim 15 characterized in that the position of the rotary speed control is retained by tension washers extending between said bushing and said bracket.

17. The positioning control of claim 12 wherein the transmission is utilized in a vehicle having a brake pedal and characterized by the addition of a compensating mechanism and in that said brake pedal moves said jaws through said compensating mechanism.

18. In a variable transmission having a rotary speed control rotation about an axis of rotation and including a neutral position and a selectively movable braking control having a braking position, a positioning control comprising an actuation lever, said actuation lever having two ends, one end of said actuation lever being fixedly connected to the rotary speed control for rotation therewith, a bushing, said bushing being fixedly connected to the other end of said actuation lever, a bracket, said bracket being fixedly connected to said transmission, a stop, said stop being fixedly connected to said bracket with the alignment of said stop and said bushing and said axis of rotation of said rotary speed control placing the rotary speed control into its neutral position, jaws, said jaws being relatively mounted to said bracket, said jaws being selectively moveable between two positions, one position of said jaws aligning said bushing with said stop, the other position of said jaws allowing the movement of said bushing in respect to said stop, a rod, and said rod mechanically interconnecting the braking control to said jaws to selectively move said jaws to said one position of said jaws so as to place the rotary speed control into its neutral position upon movement of the braking control to its braking position.

* * * * *